United States Patent [19]

Richard

[11] 4,050,734
[45] Sept. 27, 1977

[54] ROLL-UP TRUCK COVER ASSEMBLY

[76] Inventor: Douglas B. Richard, 17 Vine St., Ansonia, Conn. 06401

[21] Appl. No.: 623,446

[22] Filed: Oct. 17, 1975

Related U.S. Application Data

[63] Continuation of Ser. No. 490,252, July 22, 1974, abandoned, and a continuation-in-part of Ser. No. 272,668, July 17, 1972, abandoned.

[51] Int. Cl.[2] .............................................. B60P 7/04
[52] U.S. Cl. ..................................... 296/98; 296/100
[58] Field of Search ................. 296/98, 100, 101, 136; 105/377; 135/5 A; 160/66, 67, 68, 311

[56] References Cited

U.S. PATENT DOCUMENTS

| | | | |
|---|---|---|---|
| 1,181,715 | 5/1916 | Acre et al. | 160/68 |
| 2,906,323 | 9/1959 | Macy | 160/68 |
| 3,168,345 | 2/1965 | Roberts | 296/100 |
| 3,498,666 | 3/1970 | Harrawood | 296/100 |
| 3,515,428 | 6/1970 | Killion | 296/98 |
| 3,549,198 | 12/1970 | Cappello | 296/100 |
| 3,549,199 | 12/1970 | Sibley | 296/100 |

Primary Examiner—Robert R. Song
Assistant Examiner—Michael J. Forman
Attorney, Agent, or Firm—McCormick, Paulding & Huber

[57] ABSTRACT

A roll-up truck cover assembly for dump trucks and the like having upstanding side and end walls defining an upwardly open body for receiving particulate material which may project upwardly in a heaped or humped configuration beyond the sides of the body. The cover assembly comprises a flexible top cover substantially co-extensive with the body cross-section viewed from above and the cover extends across and is attached to a front wall of the body above the side walls with side skirts laterally closing the area adjacent front and side wall junctions. A take-up roll for the flexible cover has a spring bias for rotation in a take-up direction and is mounted on a pair of arms at upper end portions of the latter. Lower end portions of the arms are pivotally attached externally at sides of the truck body for swinging the take-up roll through an arc in a lengthwise traverse of the truck body. In one embodiment a hand crank and cable system swings the arms in a direction opposite the spring biased take-up.

19 Claims, 19 Drawing Figures

FIG. 19

ROLL-UP TRUCK COVER ASSEMBLY

CROSS REFERENCE TO RELATED APPLICATIONS

This application is a Continuation Application of copending application Ser. No. 490,252, filed July 22, 1974, now abandoned, a Continuation-In-Part of application Ser. No. 272,668, filed July 17, 1972, now abandoned.

BACKGROUND OF THE INVENTION

Various types of flexible roll-up truck covers employing tarpaulins and the like have heretofore been available. Certain of these covers have been manually movable to open and closed positions and others have been power-operted. While such covers have been generally satisfactory, they have not been entirely satisfactory particularly in respect of the ease and convenience of operation, tight closure of all areas of the truck body opening, and, conversely, full clearance of all areas of the body opening with the cover in its open position.

SUMMARY OF THE INVENTION

It is the general object of the present invention to provide a flexible roll-up truck cover assembly which exhibits a high degree of ease and convenience in use, which provides for tight closure of all areas of the truck opening when in the closed position, and which in the open position completely clears the truck opening for vertical access during loading.

DESCRIPTION OF PREFERRRED EMBODIMENTS

Figure 1:
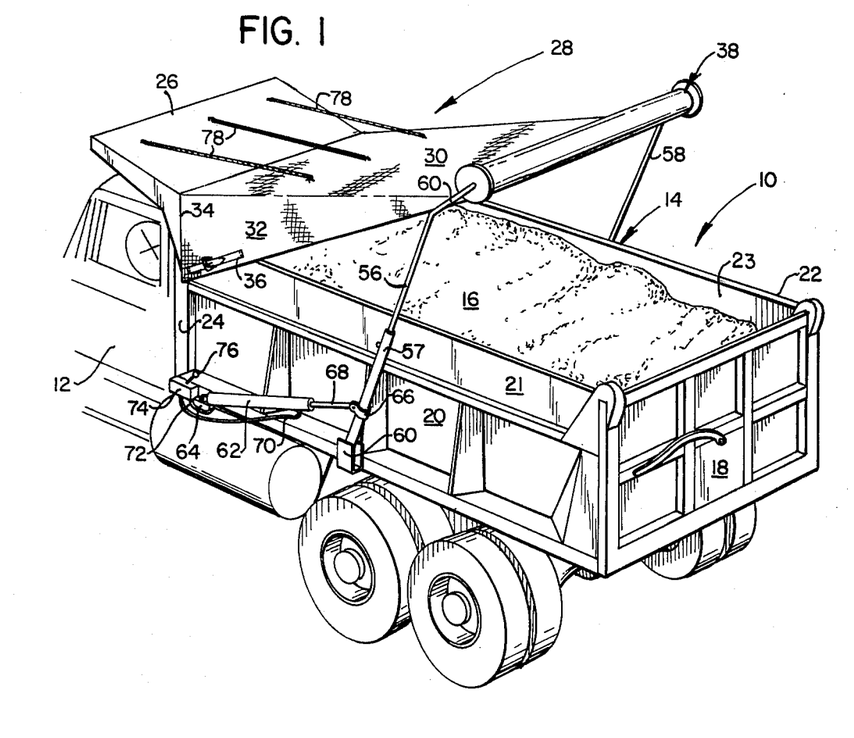
FIG. 1 is a partial perspective view of a dump truck with a cover assembly forming a first embodiment of the present invention.
Figure 2:
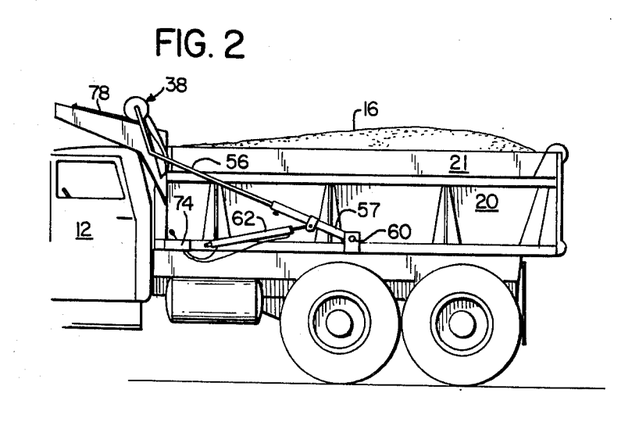
FIG. 2 is a partial side elevation of the truck showing the cover assembly in an open position.

Referring particularly to FIGS. 1 through 5, it will be observed that a truck indicated generally at 10 comprises a cab 12 and an upwardly open body 14 filled with particulate material 16. The truck is of the dump variety with a rear-end wall or hinged gate 18 which may be opened in a conventional manner, left and right-hand side walls 20, 22 and a front wall 24. The side walls 20, 22 are formed with plank-like wood upper sections 21, 23 respectively and the front wall 24 has an upper or forwardly extending portion forming a conventional headboard 26. That is, the front wall 24 extends substantially above the side walls 20, 22 and thence forwardly to form the headboard 26. As best illustrated in FIG. 2 and as is usually the case, vertical filling of the truck body may occur somewhat unevenly and in any event the load of particulate material may extend or project somewhat above the walls of the body as shown in a heap or hump configuration 16.

A cover assembly indicated generally at 28 forms a first embodiment of the present invention and comprises a flexible cover 30 which is substantially co-extensive with the cross-section of the body 14 when the latter is viewed from above. The cover 30 may be constructed of canvas, vinyl or other flexible material and has one end portion thereof extending across and attached to one end wall of the truck body. In the form shown the cover 30 is attached along a front edge portion to the front wall 24 at the rear edge of headboard 26. In accordance with the present invention, the cover 30 is completely encloses the front end portion of the body 14 whereby to prevent particulate leakage in transit. The manner in which front end closing or sealing is accomplished may vary widely within the scope of the invention, but, as presently preferred, side skirts are provided on the cover 30 and such skirts are employed in the embodiment of FIGS. 1 through 5. More particularly, left and right-hand skirts 32, 32 which may be identical, left-hand only illustrated, are provided in a triangular shape and with a narrow apex of the triangle extending rearwardly. The front wall 24 extends substantially above the side walls 20, 22 of the truck body as mentioned and a corresponding short forwardly disposed and vertically extending leg 34 of each triangular skirt 34 extends along and is fixedly attached to the said portion of the front wall 24 whereby to close the area adjacent and above the junction of the body front and side walls. As best shown in FIG. 1, the portion 34 of the left-hand skirt 32 extends downwardly somewhat beyond the wood plank-like portion 21 of the left-hand body wall 20. Further, it is preferred to include a short strap as indicated at 36 on each side skirt 32 whereby to tighten the skirts and more positively prevent particulate leakage at the areas adjacent the junctions of the side and front wall, the said areas having heretofore proven particularly troublesome in this regard.

Figure 3:
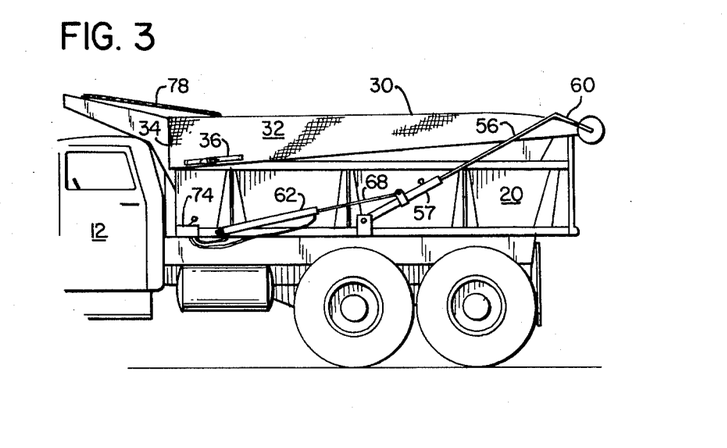
FIG. 3 is a partial side elevation of the truck showing the cover assembly in a closed position.
Figure 4:
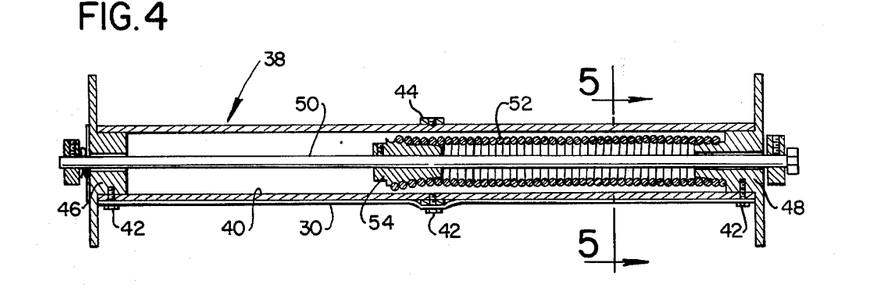
FIG. 4 is an enlarged sectional view through a take-up roll forming a part of the truck cover assembly of FIGS. 1 through 3.
Figure 5:
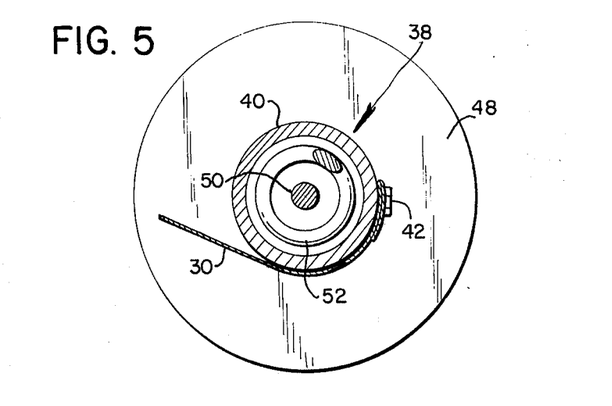
FIG. 5 is an enlarged transverse section taken generally as indicated at 5,5 in FIG. 4.

The cover assembly also includes a take-up roll indicated generally at 38 and which has an opposite or rear-end portion of the flexible cover 30 attached thereto. The take-up roll 30a includes biasing means tending to rotate the roll in a direction effecting a take-up operation on the cover. As best illustrated in FIG. 4, the cover 30 is bolted to an outer tubular portion 40 of the take-up roll 38 as by means of suitable bolts at 42, 42. An annular strengthening ring is provided at 44 and left and right-hand flanged hub sections 46, 48 are entered in opposite end positions of the tube 40. A shaft 50 extends through and is received within suitable openings in the hubs 46, 48 and the aforesaid biasing means takes the form of a coil spring 52. The spring 52 is operatively associated with the right-hand hub 48 and a center spring seat or mount 54 fixed to the shaft 50. The spring 52 is so arranged as to cause the tube 44 to rotate in the direction counterclockwise in FIGS. 1 through 3, which causes the cover 30 to assume a rolled-up or take-up position on the roll 38. Thus, the cover 30 is at all times maintained and extended in a somewhat taut or slightly tensioned condition as the roll 38 moves arcuately forwardly and/or rearwardly traversing the truck body 10.

The means for arcuately swinging the take-up roll 38 whereby to traverse the truck body in a lengthwise direction preferably takes the form of first and second arms 56, 58 which may be identical and which are pivotally mounted respectively at lower end portions externally on the sides 20, 22 of the truck body. A mounting bracket 60 is shown on the left-hand side 20 and may be taken as representative of an identical mounting bracket on an opposite side of the truck body. Further, a two-part arm 56 is provided with a slidable and adjustable connection between the parts, a lower part 57 telescopically receiving an upper part 56. The arm 58 may be of identical construction. Preferably, a short angular extension 61 is provided at an upper end portion of the arm 56 and the arm 58 is of a similar configuration. As best illustrated in FIGS. 2 and 3 the angular extension provides for a full forward positioning of the take-up roll 38 atop the headboard 26 and for a slightly downward position of the roll beyond the top edge of the rear wall or tailgate 18, FIG. 3, full covering operation thus being achieved.

Further in accordance with the present invention, the arms 56, 58 are swung in at least one direction by means of a suitable operating means, the said direction being opposite to the direction which said biasing means 52 tends to swing the arms while urging the cover in a take-up direction about the roll 38. As shown in FIG. 1 through 3, power-operated means is provided for urging the arms 56, 58 in both directions and this is one presently preferred form of the invention. A fluid operated cylinder 62 has a mounting bracket at 64 and an adjustable bracket 66 on the arm 56 has a forward end portion of the cylinder piston rod 68 connected therewith. Fluid pressure lines 70, 72 extending from the cylinder to a small control valve 74 provide for control by means of a manually operable lever 76 on the valve 74. The cylinder 62 may be assumed to be an air cylinder, but other fluid operated cylinders may also be employed. An identical arrangement on an opposite side of the truck and in association with the arm 58, but under the control of the valve 74 and lever 76, is preferably provided. Thus, the arms 56, 58 may be swung forwardly and rearwardly in unison whereby respectively to effect opening and closing operation of the cover.

In the open position of the cover, it is important to provide full clearance adjacent the front wall 24 for vertical access loading. This is, care should be taken to avoid a loose or hanging portion of the cover which blocks or partially blocks the area adjacent the front wall so as to become entangled in particulate material during loading. A means for positively clearing this area is provided in the form of elastic members 78, 78 secured at forward end portions to the headboard 26 and at rear end portions to the cover 30 some distance spaced from the front edge of the latter. Thus, the elastic members, preferably three in number as shown, tend to pull the cover forwardly to clear the area adjacent the front wall 24, FIG. 2.

Figure 6:
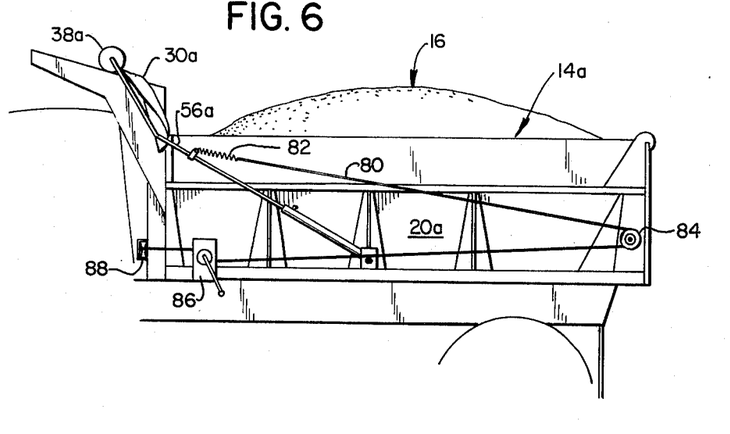
FIG. 6 is a partial side elevation of a dump truck with a cover assembly forming a second embodiment of the present invention, the cover assembly being in the open position.
Figure 7:
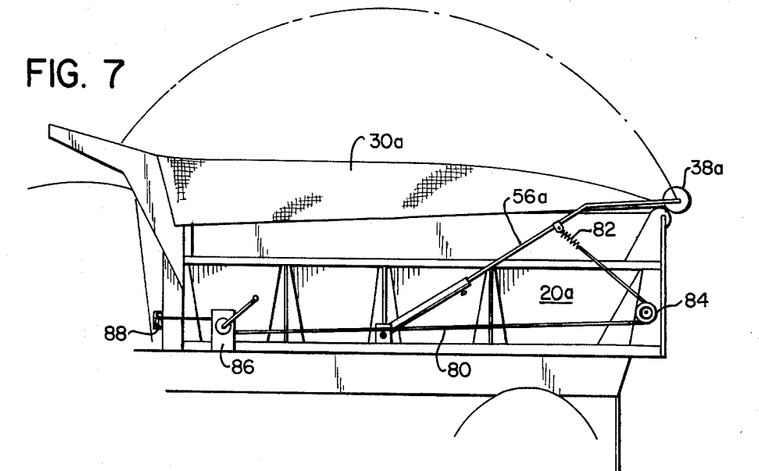
FIG. 7 is a partial side elevation of the truck and cover assembly of FIG. 6 with the cover in a closed position.

Referring now particularly to FIGS. 6 through 9, it will be observed that a truck body 14a has a particulate load 16a as in FIGS. 1 through 5. The body has a cover 30a and a take-up roll 38 a associated therewith and an arm 56a shown in FIG. 6 is substantially identical with the aforementioned arm 56. Similarly, the roll 38a and the cover 30a may be substantially identical with the corresponding elements in FIGS. 1 through 5. In FIGS. 6 through 9, however, an alternative operating means is provided and such means preferably takes the form of a hand crank and cable system. As best illustrated in FIGS. 6 and 7 a cable 80 is attached through a spring member 82 to the arm 56a. The cable 80 extends over a rearwardly located pulley 84 on the truck side 26a to the crank 86 and an associated pulley 90. A pulley at the front portion of the truck body at 88 receives the cable 80 whereupon it proceeds along an opposite side of the truck through a second identical cable-pulley system. As will be apparent, the crank arm 96 may be rotated to wind sections of the cable respectively on pulley sections 92 and 94 and thereby to swing the arms 56a and 58a rearwardly to close the cover. On release of manual pressure the arms will be swung forwardly by the take-up roll biasing spring 52a to the open position of FIG. 6.

Figure 8:
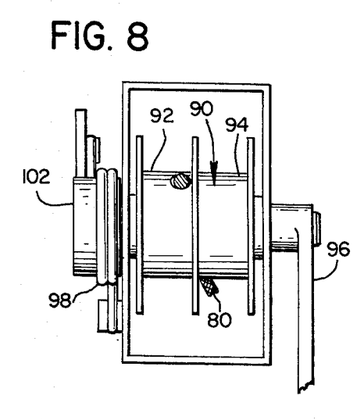
FIG. 8 is an enlarged fragmentary sectional view through a crank and pulley device forming a part of the cover assembly.
Figure 9:
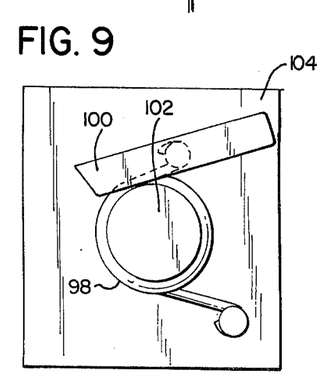
FIG. 9 is a side elevation of the crank and pulley assembly of FIG. 8, and also illustrating an associated braking mechanism.

A brake mechanism best illustrated in FIGS. 8 and 9 comprises a coil spring 98 normally in frictional gripping relationship with a pulley stub shaft 102. Movement of a small link 100 in a counterclockwise direction as indicated by the arrow 104 in FIG. 9 relieves the spring frictional forces upon the stub shaft 102 and allows the pulley 90 to turn during an opening movement of the cover. Thus, the operator may manipulate the link 100 to control the forward or opening swinging movement of the arms 56a, 58a and the take-up roll 38a.

Figure 10:
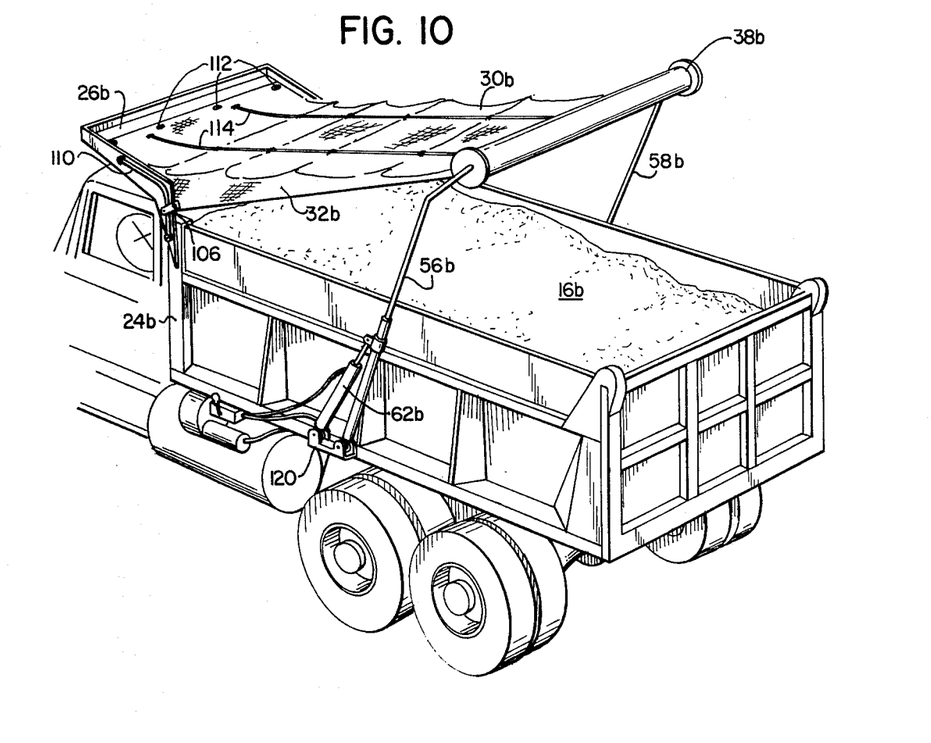
FIG. 10 is a perspective view of a truck and a cover assembly, the latter forming a third embodiment of the present invention.

The FIG. 10 through 14 embodiment includes a cover 30b, a take-up roll 38b, left and right-hand arms 56b, 58b, and operating cylinders 62b, 62b. All of said elements may be substantially the same as the counterpart elements of FIGS. 1 through 5. However, it is to be noted that side skirts 32a, 32a have a small follower 106 mounted thereon by means of grommets 108, 108, FIG. 11, and which may comprise a small pulley. The followers or pulleys 106, 106 are associated with generally L-shaped tracks 110, 110 mounted on the sides of headbaord 26a. The tracks or guideways 110, 110 provide for movement of the skirts 32a, 32a under the urging of the followers 106, 106 in an upward and forward or a downward and rearward direction respectively to open and closed positions. As best illustrated in FIG. 10, forward end connections of the cover 30b are effected at 112, 112 by means of suitable grommets so that the take-up roll 38b can rest atop the headboard as illustrated by broken line in FIG. 12. With the take-up roll so located the side skirts 32a, 32a are drawn upwardly and forwardly whereby to clear the area extending across and adjacent the front wall 24a of the truck body, Thus, loading can be achieved without danger of entanglement of the cover 30b in the particulate material of a load 16b.

Figure 11:
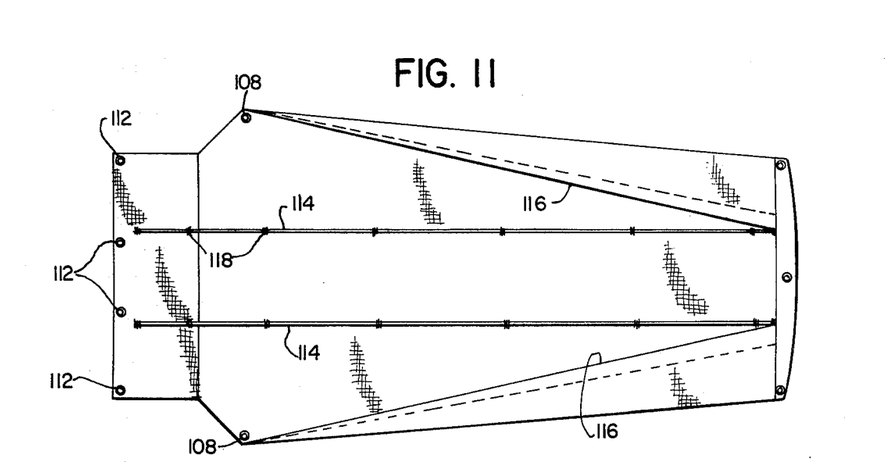
FIG. 11 is a top plan view of a flexible cover forming a part of the cover assembly of FIG. 10.

Preferably, and as best illustrated in FIG. 11, elastic members are provided as at 114, 114 and said members extend lengthwise of the cover with narrow folded regions at 116 for enhanced expansion of the cover in stretching over a load of particulate material in a heap or hump configuration. The elastic members are secured as at 118, 118 and each member is stretched progressively from front to rear to provide for a desired degree of tautness of the cover. During take-up of the cover on the roll the elastic members 114, 114 prevent droop of the cover in the central region.

The cylinders 62b, 62b are of the hydraulic type and are mounted in common on brackets 120, 120 with the arms 56b, 58b. In order to provide the necessary hydraulic power, a system is provided as illustrated schematically in FIG. 14. A reservoir and pump unit 122 for the hydraulic fluid has an associated valve 124 adapted for manual operation by means of a level 126. An air motor connected with a conventional air supply in the truck is indicated at 128. The motor 128 is connected in turn in driving relationship with the pump in the unit 122. Lines 130, 132 leading to the cylinders 62b, 62b on opposite sides of the truck body supply the necessary hydraulic power and there is preferably provided an adjustable restriction as indicated generally at 134. The adjustable restriction 134 may be utilized to insure that the arms 56b, 58b move precisely in unison. That is, by adjusting the flow through the line 132 a necessary correction can be effected to assure arm movement in unison.

Figures 12, 13:
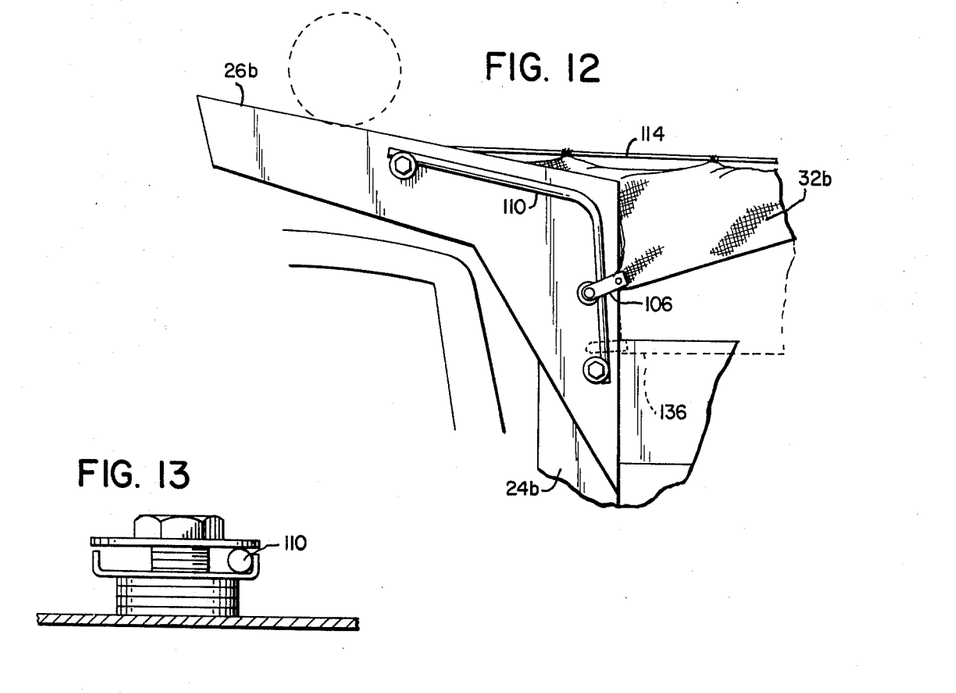
FIG. 12 is a fragmentary enlarged side elevation taken from FIG. 10 and showing a small track and follower arrangement together with a portion of a side skirt of the cover assembly.
FIG. 13 is an enlarged section showing the manner in which the track of FIG. 12 is mounted.
Figure 14:
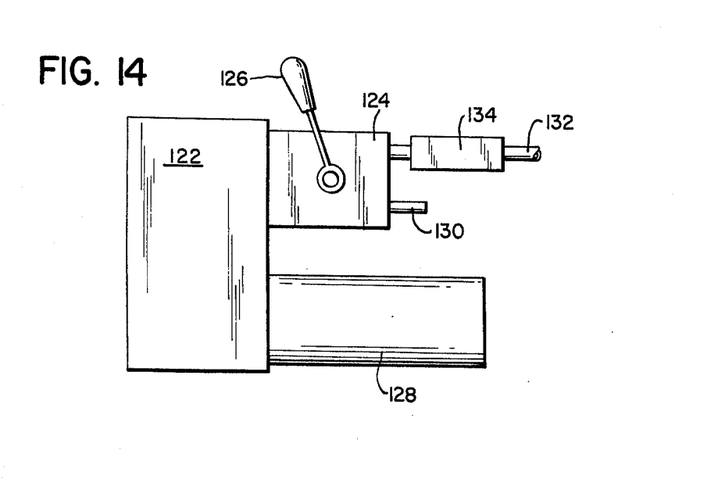
FIG. 14 is a schematic illustration of power-operating means for the cover assembly including a hydraulic reservior and pump, an air motor and an associated control valve.

As will be apparent in FIGS. 10 and 12, forward and rearward or opening and closing movement of the take-up roll 38b will result in the cover 30b being drawn into tightly closed position adjacent the critical area at the junction of the side and front walls. As the take-up roll 38b is drawn rearwardly, the followers 106, 106 pull the side skirts 32a, 32a downwardly until the said area is fully closed as indicated by broken line 136 in FIG. 12. Thus, as in preceding embodiments the particulate load 16b is completely enclosed with no leakage of material possible.

Figure 15:
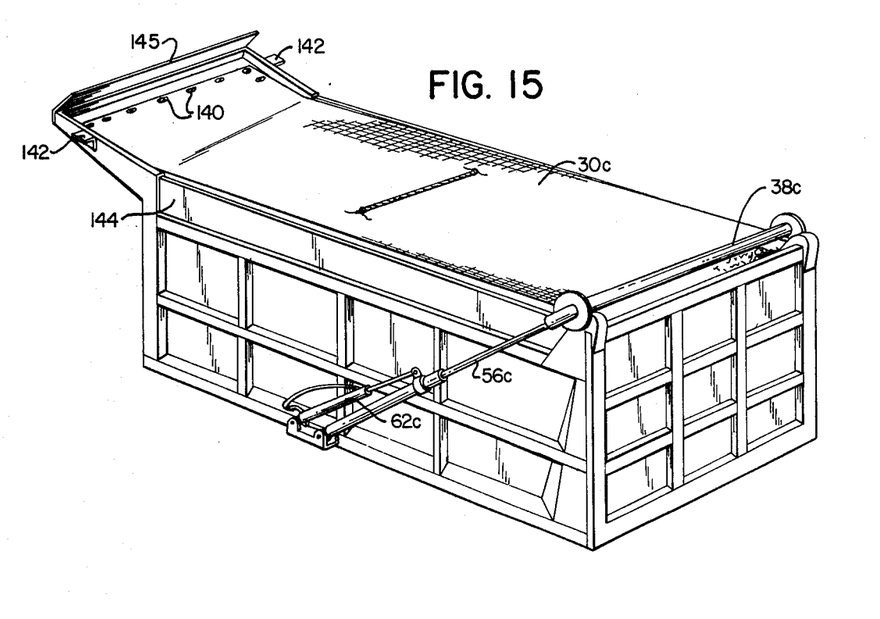
FIG. 15 is a perspective view showing a portion of a truck and a cover assembly having a modified form of attachement at a front end portion.

Referring now particularly to FIGS. 15, it will be observed that a cover 30c, a take-up roll 38c, left and right-hand arms 56c, 58c and operating cylinders 62c, 62c are or may be identical with counterpart elements described above. At a front end portion of the cover 30c, connection is accomplished to a cab guard element by means of rivets, grommets, etc. 140, 140 or by other suitable attaching means. Further, small L members 142, 142 provided at the sides of the cab guard or shield provide a seat for the take-up roll 38c when it is swung forwardly to the open position.

Side boards 144, 144, one shown, have their upper edge portions substantially level with the top of the cab guard or shield and it will thus be apparent that the top of the truck will be completely closed by the cover 30c and that no means need be provided for closing the small corner at the rear of the cab guard or shield as in the previously described cover assemblies. An air shield is preferably also provided at 145.

Figure 16:
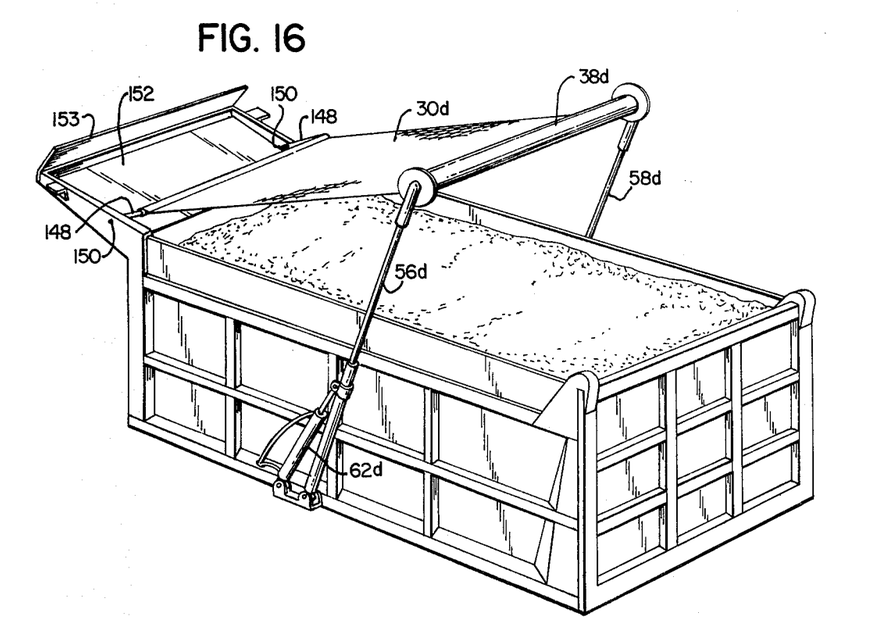
FIG. 16 is a perspective view of a truck and a cover assembly, the latter having a further modified form of attachment at a front end portion.

In FIG. 16 a cover 30d, a take-up roll 38d, arms 56d, 58d and cylinders 62d may all be substantially identical with the counterpart elements illustrated and described above. At a front end portion of the cover 30d the said cover is attached to the truck body indirectly by means of rigid cross member 146 which extends transversely and within a front end portion of the cover and which has pivotally attached end members 148, 148. The members 148, 148 have pivotal attachments with the cab guard or shield at 150, 150 so as to be swingable forwardly and rearwardly during swinging movement of the arm 66d, 58d and the take-up roll 38d. As will be apparent, the indirect attachment of the cover 30d to the cab guard or shield allows the forward end portion of the cover to rest snuggly against the take-up roll 38d when the cover assembly is in an open position. As the cover assembly is swung to a closed position, an opening 152 occurs between the cross member 146 at the front end portion of the 30d and the top of the cab guard or shield. However, said opening is temporary and with the pivot points 150, 150 properly established the member 146 will rest snuggly atop the cab guard or shield with the cover in a closed position. Thus, air flow beneath the member will be prevented and, if desired, a shield at 153 may be provided at a forward end portion of the cab guard or shield to direct the air upwardly and to avoid any possibility of entry beneath the member 146 and the cover 30d, such as might cause flapping etc.

Figure 17:
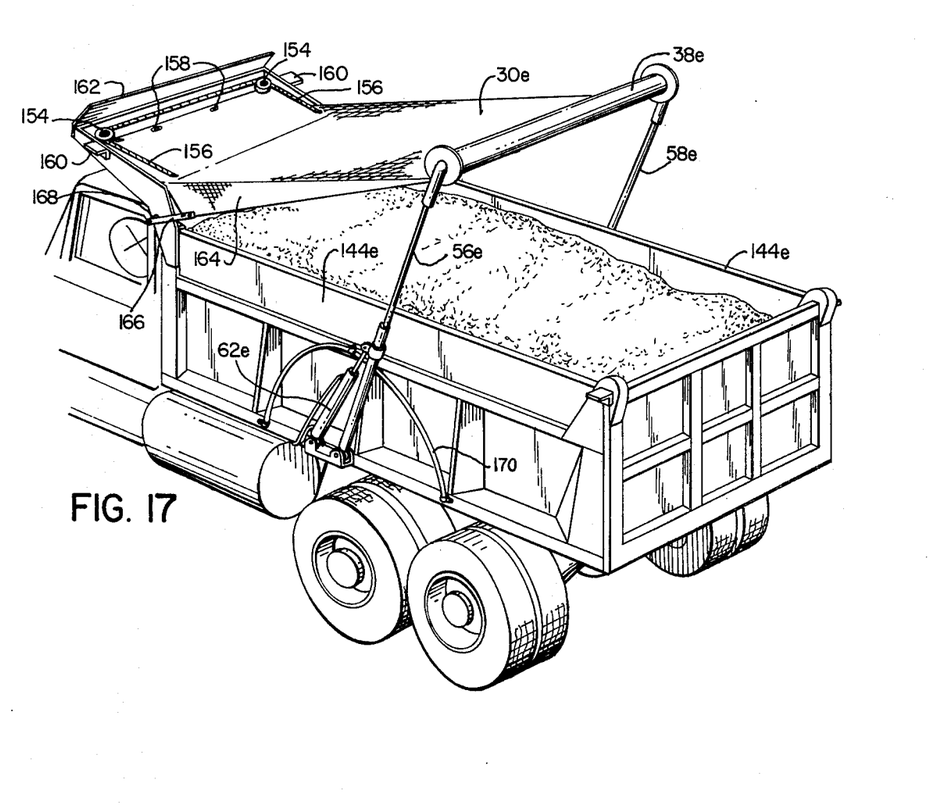
FIG. 17 is a perspective view of a truck and a cover assembly, the latter having a further modified form of attachment at a front end portion.

In FIG. 17 a cover 30e is provided with a take-up roll 38e, arms 56e and 58e and cylinders 62e, 62e. At a front end portion of the cover 30e, a pair of pulleys 154, 154 carry elastic members 156, 156 attached to the cover somewhat rearwardly of its leading edge. Further, the cover may be riveted or otherwise attached at 158, 158 to the cab guard or shield. Small L-shaped members may be provided at 160, 160 as in FIG. 15. As will be apparent, the cover 30e may have some slack when the take-up roll is moved to its forwardmost position. The elastic members 156, 156 serve to pull the slack portion of the cover forwardly whereby to prevent the same from flapping in the air stream above the truck. A shield may also be provided at 162 as in the FIG. 16 embodiment.

The sideboards 144e, 144e on the truck shown in FIG. 17 are somewhat below the cab guard or shield as in earlier embodiments and side flaps 164, 164, one shown, are provided on the cover 30e Further, a short pivotal member 166 connects with the side flap 164 shown and a similar member 166 at an opposite side of the truck connects with the flap 164 thereat. The pivotal member 166 is pivoted at a forward end portion 168 so as to swing with the swinging movement of the cover assembly. As will be apparent, the flaps 164 are thus drawn downwardly and into a closed position when the cover assembly is moved to its closed position.

There is also provided in FIG. 17 an arcuate guide member 170 adjacent the swinging arm 56e. It has been found that a rubbing action may occur between the arm 56e and the side of the truck body and the said member 170 serves as a guide to maintain the arm in a properly spaced position and to prevent damage to the truck and/or to the arm. Preferably the member 170 is on a center slightly displaced from the center of pivotal action of the arm 56e to avoid wearing a groove in the arm. As will be apparent, a similar guide 170 on an opposite side of the truck may cooperate with the arm 158e.

Figure 18:
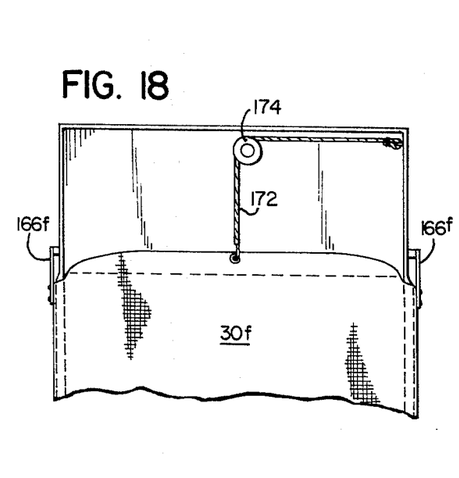
FIG. 18 is a fragmentary top view of a cover assembly having a still further modified form of attachment at a front end portion.
Figure 19:
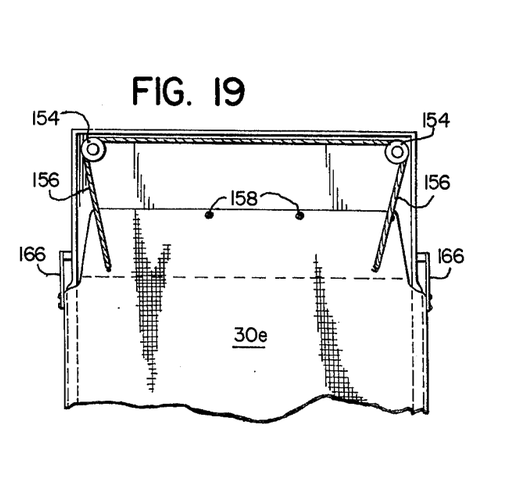
FIG. 19 is a top view of the cover assembly of FIG. 17.

FIG. 19 more clearly illustrates the front end attachement of the cover assembly 30e and in FIG. 18 a further indirect attachment of a front end portion of a cover 30f is illustrated. Thus, the cover 30f may have attachment to the truck body by means of arms such as the arms 166f, 166f and a single elastic member 172 may be attached to a central portion thereof. A pulley 174 associated with the elastic member 172 may store a portion of the member and it will be apparent that loose or slack forward portions of the member 30f will be pulled forwardly about the take-up roll when the take-up roll is swung forwardly to the cover open position. In FIG. 18 as in FIG. 16, there is no direct attachment of the front end portion of the cover to the cab guide or shield.

I claim:

1. A roll-up truck cover assembly for dump trucks and the like having upstanding side and end walls defining an upwardly open body for receiving particulate material which may project upwardly beyond the sides of body; said cover assembly comprising a flexible top cover substantially co-existensive with the body cross section viewed from above, said cover extending across the top of a front end portion of said body and being attached thereto whereby completely to close said end portion of the body and to prevent air flow beneath the cover and billowing and particulate leakage, a take-up roll for said flexible cover having an opposite end portion of the cover attached thereto substantially across its width and having associated biasing means tending to rotate the roll in a take-up operation of the cover, a pair of similar arms pivotally mounted at lower end portions externally on opposite side walls of the truck body and having upper end portions connected with and rotatably supporting opposite end portions of said take-up roll, and operating means for swinging said arms rearwardly for an arcuate roll traverse of the truck body, the said rearward movement being a cover roll-out movement and being opposite to the direction which said biasing means tends to swing said arms while urging said cover in a take-up direction about said roll, said cover during both roll-out and take-up thus having substantially no horizontal component of movement with respect to said particulate material.

2. A roll-up truck cover assembly as set forth in claim 1 wherein said body has a front end wall which projects upwardly beyond said side walls, and wherein said top cover is attached to said front end wall above said side walls and yet laterally closes the area adjacent and above the junction of said front and side walls.

3. A roll-up truck cover assembly as set forth in claim 2 wherein said top cover has depending side skirts disposed in close engagement with upwardly projecting side edge portions of said front wall adjacent the junction of said front and side walls.

4. A roll-up truck cover assembly as set forth in claim 3 wherein said side skirts of said top cover are fixedly attached to said upwardly projecting side edge portions of said front wall.

5. A roll-up truck cover assembly as set forth in claim 3 wherein said side skirts and front wall have an associated movable connection means which serves to draw the side skirs into operative position as the top cover is extended over the truck body in a closing operation, said movable connection means serving also to draw the skirts upwardly and forwardly whereby to clear for loading the area extending along said front wall.

6. A roll-up truck cover assembly as set forth in claim 3 wherein said front wall has a forwardly projecting portion defining a headboard at a top edge portion thereof, wherein said attachment of said top cover to said front wall occurs forwardly of the vertical plane of said front wall on said headboard, and wherein means is provided for drawing said skirts forwardly of the front wall plane when the cover is open and thereby clearing for loading the area adjacent and along said front wall.

7. A roll-up truck cover assembly as set forth in claim 6 wherein said last-mentioned means comprises a pair of small tracks mounted on the truck body and a cooperating pair of small track followers associated respectively with said cover side skirts.

8. A roll-up truck cover assembly as set forth in claim 6 wherein said last-mentioned means comprises elastic means connected with said headboard and with said cover at a location spaced somewhat rearwardly from said body front wall.

9. A roll-up truck cover assembly as set forth in claim 1 wherein said operating means comprises a crank and cable system connected with said arms and operable on manual manipulation of the crank to swing said arms in said one direction.

10. A roll-up truck cover assembly as set forth in claim 1 wherein said operating means for said arms is power actuated and serves to swing the arms in both said directions.

11. A roll-up truck cover assembly as set forth in claim 10 wherein said power actuated operating means comprises a pair of fluid pressure operable cylinders associated respectively with said arms.

12. A roll-up truck cover assembly as set forth in claim 11 wherein said cylinders are of the hydraulic type, wherein a hydraulic reservoir and pump are provided in association therewith, and wherein said pump has an air motor operatively associated in driving relationship therewith.

13. A roll-up truck cover assembly as set forth in claim 1 wherein said front wall has a forwardly projecting portion defining a headboard at a top edge portion thereof, wherein said attachment of said top cover to said front wall occurs forwardly of the vertical plane of said front wall on said headboard, and wherein said side walls have their top edges substantially level with said forwardly projecting headboard portion, said cover thus having a substantially flat contour.

14. A roll-up truck cover assembly as set forth in claim 13 wherein an air shield is provided forwardly of said cover on said headboard, said shield serving to direct a stream of air upwardly and over said cover and to prevent the entry of air beneath said cover.

15. A roll-up truck cover assembly as set forth in claim 1 wherein a rigid cross member is provided at a front end portion of said cover and extends thereacross with short side member attached at opposite ends thereof, said side members extending from said cross member and being pivotally attached to said truck body whereby to swing forwardly and rearwardly during closing and opening operations of said cover assembly, said rigid member closing said front end portion of said body in the closed position of the cover assembly.

16. A roll-up truck cover assembly as set forth in claim 1 wherein said cover has a front end portion thereof attached to said body indirectly by flexible means, said flexible means serving to draw slack or loose portions of the cover tightly about the said take-up roll when the cover assembly is in the open position.

17. A roll-up truck cover assembly as set forth in claim 16 wherein said flexible means comprise first and second flexible elements having one end portion attached to said cover at a location spaced from an end portion of the cover to pull slack or loose portions thereof tightly about the take-up roll.

18. A roll-up truck cover assembly as set forth in claim 16 wherein a single flexible means is provided for attaching said end portion of said cover to said body.

19. A roll-up truck cover assembly as set forth in claim 1 wherein said cover is provided with side skirts and wherein a pair of pivotally mounted members are operatively associated respectively with said side skirts, said pivotally operable members having end portions connected with the truck body whereby to pull said skirts to a tightly closed position at an area adjacent and above the junction of said front and side walls when said cover assembly is moved to a closed position.

* * * * *